3,167,532
TIN SALTS OF P-VINYLBENZOIC ACID, POLY-
MERS THEREOF AND PROCESS FOR PRE-
PARING SAID SALTS
John R. Leebrick, Roselle Park, N.J., assignor, by mesne
assignments, to M & T Chemicals Inc., New York, N.Y.,
a corporation of Delaware
No Drawing. Filed June 6, 1960, Ser. No. 33,943
20 Claims. (Cl. 260—86.1)

This invention relates to novel tin salts of vinylbenzoic acid and to methods of their preparation. The invention also relates to polymeric compositions prepared from these novel tin salts.

It is an object of this invention to provide novel organotin salts. It is also an object of this invention to provide processes for preparing these novel organotin salts. The invention also contemplates providing novel polymeric compositions.

In accordance with this invention there is provided an organotin salt of p-vinylbenzoic acid having the following general formula

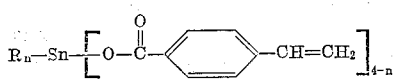

wherein R is selected from the group consisting of alkyl and alkenyl groups of up to 18 carbon atoms and monocarbocyclic aryl groups, and $n$ is an integer from 1 to 3. When $n$ is 2 or 3, the 2 or 3 R groups may be the same—or may differ, i.e., phenyldibutyltin-p-vinylbenzoate. Illustrative of useful alkyl and alkenyl groups are the methyl, vinyl, allyl, butyl, octyl, benzyl, oleyl, and lauryl groups. R can be a long-chain aliphatic moiety where slight plasticizing properties are desired along with stabilizing effects in the polymer in which the tin-p-vinylbenzoate is incorporated. In addition R may have other substituents attached, such as polyoxyethylene moieties, to impart to the organotin-p-vinylbenzoate compound a detergent property and to assist in total dispersion thereof in the medium in which it is incorporated.

The preferred organotin-p-vinylbenzoates have the general formula

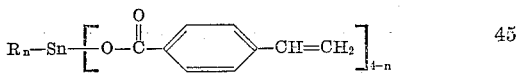

wherein $n$ is 2 or 3 and R is an alkyl or alkenyl group containing 1 to 6 carbon atoms, benzyl, phenyl, or p-chlorophenyl.

Illustrative processes for preparing the organotin benzoates follow:

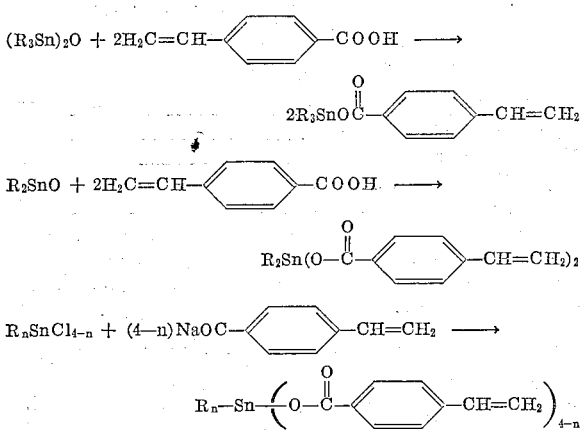

When the organotin oxide is reacted with p-vinylbenzoic acid to form the di-substituted tin-di-p-vinylbenzoate or the tri-substituted organotin-p-vinylbenzoate the reaction may be carried out by mixing the appropriate quantities of $(R_3Sn)_2O$ or $R_2SnO$ and p-vinylbenzoic acid, with or without solvent. The reaction is preferably carried out in an inert solvent such as benzene, toluene, xylene, and heptane. Generally heating is required to effect completion of reaction. Temperatures of reaction may be between room temperature and 135° C. The reaction sequence utilizing the organotin chloride and the sodium salt is illustrative of the process in which an organotin halide is reacted with a metal or ammonium salt of p-vinylbenzoic acid. The alkali metal and alkaline earth metals, and particularly the sodium salts, are preferred. While any of the halides may be used, the bromides and chlorides are preferred.

The inert solvent which helps maintain the fluidity of the reaction in the formation of the organotin-p-vinylbenzoates can be distilled off (or removed by heating in vacuo) from the reaction mixture after completion of the synthesis. In this fashion there is obtained the organotin-p-vinylbenzoate which can be immediately directly polymerized, alone or with other monomers and polymers. This represents a further advantage of the process in that costly purification procedures are not required. If desired, polymerization inhibitors can be added to the reaction mixture in the formation of the organotin-p-vinylbenzoates of this invention to prevent spontaneous polymerization of the monomers.

When the organotin-p-vinylbenzoates of the instant invention are copolymerized with other monomers these other monomers may form a major or minor proportion of the total resinous composition. An illustrative polymeric composition may comprise a major amount of polyvinyl alcohol and a minor amount of the tin ester moiety. Other monomers are those polymerizable compounds which contain at least one ethylenic unsaturation and include vinyl chloride, vinyl acetate, styrene, methyl vinyl ketone, vinylidene chloride. Other compounds in this category are the acrylic esters, such as methyl and ethyl acrylates, chloroacrylic esters and methacrylic esters, acrylonitrile, methacrylonitrile, butadiene, isoprene and chloroprene.

The polymers contain at least one tin ester moiety in the polymeric structure as illustrated below:

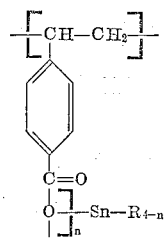

The vinyl groups in the polymer are bonded to other similar or dissimilar moieties, depending on whether the material has been homo- or co-polymerized. When a di-substituted organotin-p-vinylbenzoate is used it forms a polymeric unit which can be designated as follows:

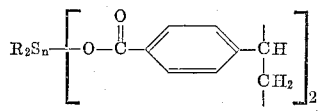

The bis compounds are useful as cross-linking agents, acting quite similar to divinylbenzene. They perform the dual function of cross-linking and modifying the polymeric composition into which they are incorporated.

The vinyl radical on these compounds permit the incorporation of the molecule into polymeric materials by either a direct polymerization reaction or by a graft polymerization technique (on an already formed polymer). The polymerization conditions to be utilized in forming the resinous compounds containing the monomers of this invention are conventional. The polymerization reaction may be effected either in solution, in emulsion using either a bulk or mass polymerization in the absence of a non-reactive solvent, or a dispersing medium. Suitable solvents include toluene, tetrahydrofuran and water. Usually a polymerization initiator is employed and the reaction is heated to accelerate polymerization. The techniques customarily used in polymerizing vinyl monomers are satisfactory for the polymerization of the monomers of this invention. Temperatures of polymerization are those used in vinyl polymer formation. Polymerization initiators or catalysts include the so-called peroxy catalysts, such as benzoyl peroxide, lauroyl peroxide, tertiary alkyl peroxides, di(tertiary alkyl) peroxides; alkali-metal persulfates such as potassium persulfate; and other polymerization catalysts such as azo-bis-(isobutyronitrile). Free radical catalysts can be utilized. The amount of catalyst will depend on the polymerization rate desired and on the temperature of polymerization.

The following examples illustrate the preparation of the new monomers of this invention and the formation of polymeric compositions therefrom.

*Example 1.—Dibutyltin bis-p-vinylbenzoate*

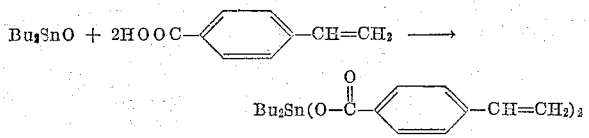

A mixture containing 5 g. butyltin oxide ($Bu_2SnO$) (0.02 ml.), 6 g. of p-vinylbenzoic acid (0.04 mole) and 50 ml. of benzene was heated under reflux in a Dean-Stark apparatus until the theoretical amount water was removed by azeotropic distillation. The final reaction mixture was a clear solution. Evaporation of the benzene gave the product.

*Examples 2–9*

Following the procedure of Example 1 and utilizing the specified organotin oxide in place of dibutyltin oxide in stoichiometric proportions, the respective organotin p-vinylbenzoate is formed.

| Example No. | | |
|---|---|---|
| 2 | Dimethyltin oxide | Dimethyltin bis p-vinylbenzoate |
| 3 | Divinyltin oxide | Divinyltin bis p-vinylbenzoate. |
| 4 | Diallyltin oxide | Diallyltin bis p-vinylbenzoate. |
| 5 | Dihexyltin oxide | Dihexyltin bis p-vinylbenzoate. |
| 6 | Diphenyltin oxide | Diphenyltin bis p-vinylbenzoate. |
| 7 | Dibenzyltin oxide | Dibenzyltin bis p-vinylbenzoate. |
| 8 | Dichlorophenyltin oxide | Dichlorophenyltin bis p-vinylbenzoate. |
| 9 | Dioctyltin oxide | Dioctyltin bis p-vinylbenzoate. |

*Example 10.—Tributyltin p-vinylbenzoate*

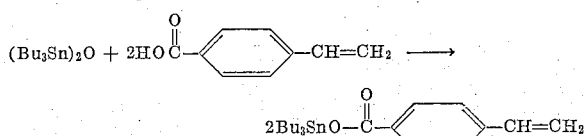

To 11.9 g. (0.02 mole) of tributyltin oxide at 80° C. was added 5.9 g. (0.04 mole) of p-vinylbenzoic acid over a period of 15 minutes. The mixture was stirred constantly throughout. The reaction mixture was then heated to 120° C. to flash off the water which formed. The product was a clear viscous oil.

*Example 11.—Dibutyltin bis-p-vinylbenzoate*

Dibutyltin dichloride (1 mole) and ammonium p-vinylbenzoate (2 moles) are stirred in refluxing benzene (100 ml.). After 2 hours, the deposited salt is removed by filtration and the solvent distilled off to yield dibutyltin bis-p-vinylbenzoate.

*Example 12.—Octyltin tris-p-vinylbenzoate*

Following the procedure of Example 11, and using octyltin trichloride (1 mole) and sodium p-vinylbenzoate (3 moles), the octyltin tris-p-vinylbenzoate is obtained.

*Example 13.—Polymerization of tributyltin p-vinylbenzoate*

To several milliliters of the product of Example 10 (about 5 g.) was added two drops of di-tertiary butyl peroxide. The mixture was thoroughly mixed and placed in a bath at 160° C. In 10 minutes a brown rubbery polymer formed. Polymerization was completed by heating for a further ½ hr. at 150–160° C.

*Example 14.—Polymerization of tributyltin p-vinylbenzoate in an emulsion system*

The following recipe was prepared:

| | |
|---|---|
| Tributyltin p-vinylbenzoate | g-- 43.7 |
| Distilled water | cc-- 90.0 |
| Tergitol NPX (registered TM) | g-- 2.5 |
| Lauryl mercaptan | g-- 0.3 |
| Polyvinyl alcohol | g-- 0.05 |
| Benzoyl peroxide | g-- 0.20 |

The above mixture was refluxed for 4 hours while effecting thorough stirring. Coagulation occurred early in the conversion. The water was removed by decantation and the rubbery residue was washed with methanol. The washed product was then air dried and then vacuum dried at 50° C. The product was a strong tacky rubber.

*Example 15.—Copolymer of tributyltin p-vinylbenzoate and p-chlorostyrene*

The following recipe was prepared:

| | |
|---|---|
| Tributyltin p-vinylbenzoate | g-- 43.7 |
| p-Chlorostyrene | g-- 10 |
| Distilled Water | cc-- 100 |
| Tergitol NPX | g-- 3 |
| Lauryl mercaptan | g-- 0.3 |
| Polyvinyl alcohol | g-- 0.05 |
| Benzoyl peroxide | g-- 0.25 |

The above mixture was heated to reflux for 6 hours. A polymer formed in an hour. At the end of the 6 hour period the polymer was in the form of a spongy rubber. The liquid portion was decanted and the residue was washed with methanol and the washed material was then air dried.

*Example 16.—Copolymer of dibutyltin bis-p-vinylbenzoate and styrene*

Following the procedure of Example 15 and using styrene instead of p-chlorostyrene and dibutyltin bis-p-vinylbenzoate instead of the tributyltin p-vinylbenzoate, the equivalent copolymer is formed.

*Example 17.—Copolymer of tributyltin p-vinylbenzoate and methylmethacrylate*

The following recipe was prepared:

| | |
|---|---|
| Methylmethacrylate | g-- 18 |
| Tributyltin p-vinylbenzoate | g-- 2 |
| Distilled water | cc-- 100 |
| Polyvinyl alcohol | g-- 0.02 |
| Benzoyl peroxide | g-- 0.2 |

The above mix was refluxed for 4 hours and then cooled, filtered and water washed, yielding a white solid. A film was formed by dissolving this polymer in tetrahydrofuran and then dissolving the solvent.

*Example 18.—Copolymer of diphenyltin bis-p-vinylbenzoate and methylmethacrylate*

Following the procedure of Example 17 and using diphenyltin bis-p-vinylbenzoate in place of the triorganotin salt, the respective copolymer is obtained.

The organotin p-vinylbenzoates have a variety of useful applications. They catalyze the foaming of urethane resins and are particularly useful as catalysts in the one-step foam process. The diorganotins, and to a lesser extent the triorganotins, are useful as stabilizers to prevent heat and light degradation of resins in which they are incorporated, particularly polyvinyl chlorides. By virtue of their ability to copolymerize, it is possible to incorporate them in resins with great uniformity to modify the characteristics of the resins in a lasting manner. For many purposes, and particularly for use in packaging or treating foods, it is necessary that the organotin compound utilized as a stabilizer should not leach. By copolymerizing the compounds in the resin such conditions are attained. The triorganotin p-vinylbenzoates have fungicidal activity and are particularly effective against such bacteria and fungi as *Staphylicoccus aureus, Bacillus mycoides, Aerobacter aerogenes, Pseudomonas aeruginosa, Penicillium funiculosum,* and *Aspergillus flavus.* This activity is also present in polymers formed from these compounds.

As many embodiments of this invention may be made without departing from the spirit and scope thereof, it is to be understood that the invention includes all such modifications and variations as come within the scope of the appended claims.

I claim:

1. A tin salt of p-vinylbenzoic acid having the general formula

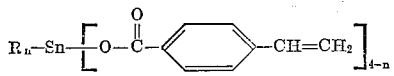

wherein R is selected from the group consisting of alkyl and alkenyl groups of up to 18 carbon atoms and monocarbocyclic aryl groups, and $n$ is an integer from 1 to 3.

2. A tin salt according to claim 1 in which $n$ is an integer from 2 to 3 and R is an alkyl group containing 1 to 6 carbon atoms.

3. A tin salt according to claim 2 in which R is a butyl group.

4. A tin salt according to claim 1 in which R is a benzyl group.

5. A tin salt according to claim 1 in which R is a phenyl group and $n$ is an integer from 2 to 3.

6. A process of producing a tin salt of p-vinylbenzoic acid having the general formula

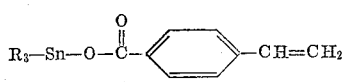

wherein R is selected from the group consisting of alkyl and alkenyl groups of up to 18 carbon atoms, and monocarbocyclic aryl groups, which comprises treating a tin oxide compound of the formula $(R_3Sn)_2O$ with p-vinylbenzoic acid.

7. A process for preparing a tin salt of p-vinylbenzoic acid having the general formula

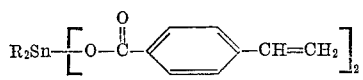

wherein R is selected from the group consisting of alkyl and alkenyl groups of up to 18 carbon atoms, and monocarbocyclic aryl groups, which comprises treating a tin oxide compound of the formula $R_2SnO$ with p-vinylbenzoic acid.

8. A process for preparing a tin salt of p-vinylbenzoic acid having the general formula

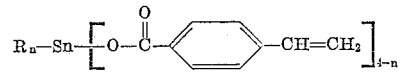

wherein R is selected from the group consisting of alkyl and alkenyl groups of up to 18 carbon atoms, and monocarbocyclic aryl groups, which comprises condensing a tin halide of the general formula $$R_nSnX_{4-n}$$

wherein X is a halide and $n$ is an integer from 1 to 3, with a salt of p-vinylbenzoic acid selected from the class consisting of metal and ammonium salts.

9. A process according to claim 8 in which the tin halide has the formula $RSnCl_3$.

10. A process according to claim 8 in which the metal salt is an alkaline earth metal salt.

11. A process according to claim 8 in which the metal salt is an alkali metal salt.

12. A process according to claim 8 in which the salt is the ammonium salt.

13. A polymeric composition having as at least one unit in the polymeric structure a tin ester moiety of the following general formula

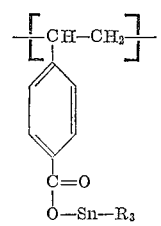

wherein R is a member selected from the group consisting of alkyl and alkenyl groups of up to 18 carbon atoms, and monocarbocyclic aryl groups.

14. A polymeric composition according to claim 13 in which the polymer is a homopolymer.

15. A polymeric composition according to claim 13 in which the R groups are alkyl radicals of up to 6 carbon atoms.

16. A polymeric composition according to claim 13 in which the R groups are phenyl groups.

17. A polymeric composition according to claim 13 which is a copolymer containing a minor amount of the tin ester moiety and a major amount of methyl methacrylate.

18. A polymeric composition according to claim 13 which is a copolymer containing a minor amount of the tin ester moiety and a major amount of styrene.

19. A polymeric composition having as at least one unit in the polymeric structure a tin ester moiety of the following general formula

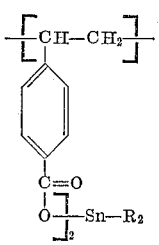

wherein R is a member selected from the group consisting of alkyl and akenyl groups of up to 18 carbon atoms, and monocarbocyclic aryl groups.

20. A tin salt of p-vinylbenzoic acid having the general formula

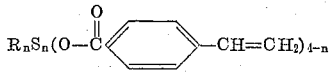

wherein R is a chlorophenyl group, and $n$ is an integer from 1–3.

References Cited by the Examiner
UNITED STATES PATENTS

| | | | |
|---|---|---|---|
| 2,344,002 | 3/44 | Rugeley et al. | 260—429.7 |
| 2,598,496 | 5/52 | Bradley et al. | 260—429.7 |
| 3,016,369 | 1/62 | Montermoso et al. | 260—80 |
| 3,031,483 | 4/62 | Koopmans et al. | 260—429.7 |

OTHER REFERENCES

Andrews et al.: Journal of American Chemical Society, vol. 80, pages 4102–4 (1958).

Bergmann et al.: Journal of Organic Chemistry, vol. 24, pages 549–551 (1959).

Fisher: Journal of Chemical Education, vol. 37, page 375 (1960).

LEON J. BERCOVITZ, *Primary Examiner.*

MILTON STERMAN, JOSEPH L. SCHOFER, DONALD E. CZAJA, *Examiners.*